(12) United States Patent
Saito et al.

(10) Patent No.: US 8,012,369 B2
(45) Date of Patent: Sep. 6, 2011

(54) LIQUID CRYSTAL COMPOSITION AND LIQUID CRYSTAL DISPLAY DEVICE

(75) Inventors: Masayuki Saito, Chiba (JP); Shuichi Goto, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 23 days.

(21) Appl. No.: 12/526,942

(22) PCT Filed: Feb. 5, 2008

(86) PCT No.: PCT/JP2008/051855
§ 371 (c)(1), (2), (4) Date: Aug. 12, 2009

(87) PCT Pub. No.: WO2008/102641
PCT Pub. Date: Aug. 28, 2008

(65) Prior Publication Data
US 2010/0060843 A1 Mar. 11, 2010

(30) Foreign Application Priority Data
Feb. 19, 2007 (JP) ................. 2007-037751

(51) Int. Cl.
*C09K 19/00* (2006.01)
*C09K 19/06* (2006.01)
*C09K 19/52* (2006.01)
*C09K 19/32* (2006.01)

(52) U.S. Cl. ........... 252/299.6; 252/299.68; 252/299.01; 430/20; 428/1.1; 349/1; 349/56; 349/182

(58) Field of Classification Search ............. 252/299.01, 252/299.6, 299.68; 349/1, 56, 182; 428/1.1; 430/20
See application file for complete search history.

(56) References Cited

U.S. PATENT DOCUMENTS

| 3,660,505 A | 5/1972 | Starnes et al. |
| 6,315,922 B1 | 11/2001 | Takeshita et al. |
| 6,325,949 B1 | 12/2001 | Takeshita et al. |
| 6,497,929 B1 | 12/2002 | Miyairi et al. |
| 7,470,456 B2 * | 12/2008 | Yanai et al. ............. 428/1.1 |
| 2005/0279968 A1 | 12/2005 | Manabe et al. |
| 2007/0001149 A1 | 1/2007 | Manabe et al. |

FOREIGN PATENT DOCUMENTS

| JP | H2-233626 | 9/1990 |
| JP | H2-237949 | 9/1990 |
| JP | H10-251186 | 9/1998 |
| JP | H11-043450 | 2/1999 |
| WO | 2005/007775 | 1/2005 |

* cited by examiner

*Primary Examiner* — Geraldina Visconti
(74) *Attorney, Agent, or Firm* — J.C. Patents

(57) ABSTRACT

A liquid crystal composition is described, which satisfies at least one characteristic among high maximum temperature of a nematic phase, low minimum temperature of a nematic phase, small viscosity, large optical anisotropy, large dielectric anisotropy, large specific resistance, high stability to ultraviolet light, high stability to heat and so on, or is properly balanced regarding at least two of the characteristics. To provide an AM device having short response time, large voltage holding ratio, large contrast ratio, long service life and so forth, the liquid crystal composition has a nematic phase and contains a specific three-ring compound having a large optical anisotropy as a first component, a specific four-ring compound having a large dielectric anisotropy as a second component, and a specific two-ring compound having a particularly small viscosity as a third component. A liquid crystal display device containing the liquid crystal composition is also described.

23 Claims, No Drawings

LIQUID CRYSTAL COMPOSITION AND LIQUID CRYSTAL DISPLAY DEVICE

FIELD OF THE INVENTION

The invention relates mainly to a liquid crystal composition suitable for use in an active matrix (AM) device, and an AM device containing the composition. In particular, the invention relates to a liquid crystal composition having a positive dielectric anisotropy, and to a device having a TN (twisted nematic) mode, an OCB (optically compensated bend) mode or an IPS (in-plane switching) mode containing the composition.

RELATED ART

In a liquid crystal display device, classifications based on an operating mode of liquid crystals include phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the two. The general characteristics of the composition will be explained further based on a commercially available AM device. A temperature range of a nematic phase relates to the temperature range in which the device can be used. A desirable maximum temperature of the nematic phase is 70° C. or more and a desirable minimum temperature is −10° C. or less. The viscosity and the rotational viscosity of the composition relate to the response time of the device. A short response time is desirable for displaying a moving image. Accordingly, a small viscosity of the composition is desirable. A small viscosity at a low temperature is more desirable.

TABLE 1

General characteristics of liquid crystal composition and AM device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large. | Threshold voltage is low, electric power consumption is small, and a contrast ratio is large |
| 5 | Specific resistance is large | Voltage holding ratio is large and a contrast ratio is large |
| 6 | It is stable to ultraviolet light and heat | Service life is long |

[1] A liquid crystal composition can be injected into a cell in a short time.

The optical anisotropy of the composition relates to the contrast ratio of the device. A product ($\Delta n \cdot d$) of the optical anisotropy ($\Delta n$) of the composition and the cell gap (d) of the device is designed to maximize the contrast ratio. A suitable value of the product depends on the kind of operation mode. In a device having a TN mode, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance at room temperature and also at a high temperature is desirable after it has been used for a long time. A stability of the composition to an ultraviolet light and heat relates to a service life of the liquid crystal device. The service life of the device is long when the stability is high. These characteristics are desirable for an AM device used for a liquid crystal projector, a liquid crystal television and so forth.

The former compositions are disclosed in the following patent documents: JP H11-43450 A, JP 2006-503130 A, and WO 2005-007775 A.

A desirable AM device is characterized as having a usable temperature range that is wide, a response time that is short, a contrast ratio that is large, a threshold voltage that is low, a voltage holding ratio that is large, a service life that is long, and so forth. Even a one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

Issues to Be Solved by the Invention

The first object of the invention is a liquid crystal composition having at least one of the following properties: a high maximum temperature of the nematic phase, a low minimum temperature of the nematic phase, a small viscosity, a large optical anisotropy, a large dielectric anisotropy, a large specific resistance, a high stability to an ultraviolet light, a high stability to heat, and so forth. Another object is a liquid crystal composition having a moderate balance between at least two of the above properties. Still another object is an LCD device containing such a liquid crystal composition. Yet another object is a composition having a large optical anisotropy, a large dielectric anisotropy, a high stability to UV light and so on, and an AM device having a short response time, a large voltage holding ratio, a large contrast ratio, a long service life and so on.

Solutions for the Issues

The solutions include a liquid crystal composition having a nematic phase, and an LCD device containing the composition. The liquid crystal composition having a nematic phase includes: a first component as at least one compound selected from the group of compounds represented by formula (1-1) and formula (1-2), a second component as at least one compound selected from the group of compounds represented by formula (2), and a third component as at least one compound selected from the group of compounds represented by formula (3):

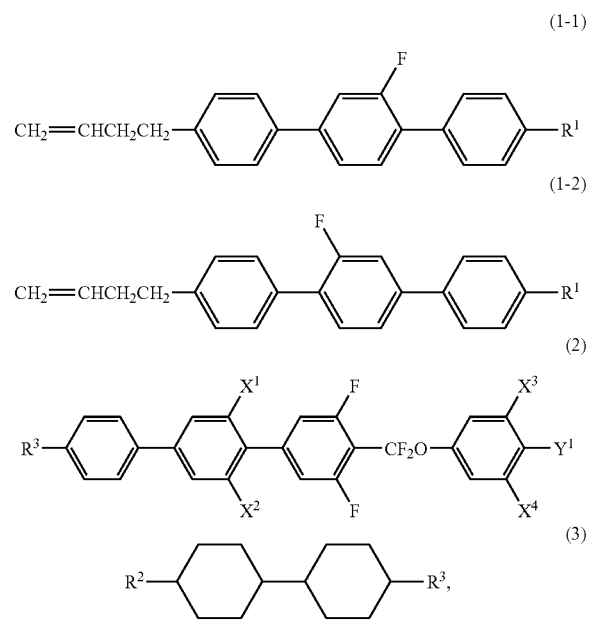

wherein $R^1$ is alkyl having 1 to 12 carbons, $R^2$ and $R^3$ are independently alkyl having 1 to 12 carbons, alkoxy having 1 to 12 carbons, alkenyl having 2 to 12 carbons, or alkenyl having 2 to 12 carbons of which arbitrary hydrogen is replaced by fluorine; $X^1$, $X^2$, $X^3$ and $X^4$ are each independently hydrogen or fluorine; $Y^1$ is fluorine, chlorine or trifluoromethoxy.

Effects of the Invention

A merit of the invention is a liquid crystal composition having at least one of the following properties: a high maximum temperature of the nematic phase, a low minimum temperature of the nematic phase, a small viscosity, a large optical anisotropy, a large dielectric anisotropy, a large specific resistance, a high stability to an ultraviolet light, a high stability to heat, and so forth. An aspect of this invention is a liquid crystal composition having a moderate balance between at least two of the above properties. Another aspect is an LCD device containing such a liquid crystal composition. Yet another aspect is a composition having a large optical anisotropy, a large dielectric anisotropy, a high stability to UV light and so on, and an AM device having a short response time, a large voltage holding ratio, a large contrast ratio, a long service life and so on.

DETAILED DESCRIPTION OF THE INVENTION

The terms used in the specification and claims are defined as follows. The liquid crystal composition or the liquid crystal display device of the invention are occasionally expressed simply as "the composition" or "the device," respectively. A liquid crystal display device is a generic term for a liquid crystal display panel and a liquid crystal display module. A "liquid crystal compound" is a generic term for a compound having a liquid crystal phase such as a nematic phase, a smectic phase and so forth, and a compound having no liquid crystal phase but being useful as a component of a composition. The useful compound contains a 6-membered ring such as 1,4-cyclohexylene and 1,4-phenylene, and a rod-like molecular structure. An optically active compound may occasionally be added to the composition; even in a case where the compound is a liquid crystal compound, the compound is classified into an additive. At least one compound selected from a group of compounds represented by formula (1-1) may be abbreviated to "the compound (1-1)." The term "the compound (1-1)" means one compound or two or more compounds represented by formula (1-1). The other formulas are applied with the same rules. The term "arbitrary" means not only an arbitrary position but also an arbitrary number, and the cases where the number is zero are not included.

An upper limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, and that the composition has a large specific resistance at room temperature and also at a high temperature even after it has been used for a long time. "A voltage holding ratio is large" means that a device has a large voltage holding ratio at room temperature and also at a high temperature in the initial stage, and that the device has a large voltage holding ratio at room temperature and also at a high temperature even after it has been used for a long time. In the description of the characteristics, such as optical anisotropy, the characteristic values provided are those measured in the methods disclosed in Examples. The first component is one compound, or two or more compounds. "The proportion of the first component" means the percentage by weight (wt %) of the first component based on the total weight of the liquid crystal composition. The proportion of the second component and so forth are applied with the same rule. The proportion of an additive mixed with the composition means the percentage by weight (wt %) based on the total weight of the liquid crystal composition.

The symbol $R^1$ is used for many compounds in the chemical formulas for the component compounds. The groups $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. This rule is also applied to the symbols $R^2$, $R^3$ and so forth. "CL" means chlorine.

The invention includes the following items:
1. A liquid crystal composition having a nematic phase and including: a first component as at least one compound selected from the group of compounds represented by formula (1-1) and formula (1-2), a second component as at least one compound selected from the group of compounds represented by formula (2), and a third component as at least one compound selected from the group of compounds represented by formula (3):

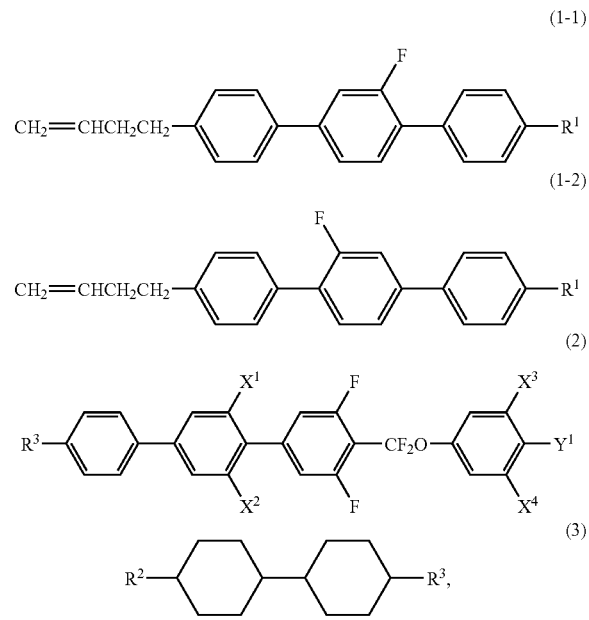

wherein $R^1$ is alkyl having 1 to 12 carbons, $R^2$ and $R^3$ are each independently alkyl having 1 to 12 carbons, alkoxy having 1 to 12 carbons, alkenyl having 2 to 12 carbons, or alkenyl having 2 to 12 carbons of which arbitrary hydrogen is replaced by fluorine; $X^1$, $X^2$, $X^3$ and $X^4$ are each independently hydrogen or fluorine; $Y^1$ is fluorine, chlorine or trifluoromethoxy.

2. The liquid crystal composition according to item 1, wherein the second component is at least one compound selected from the group of compounds represented by formula from (2-1) to (2-3):

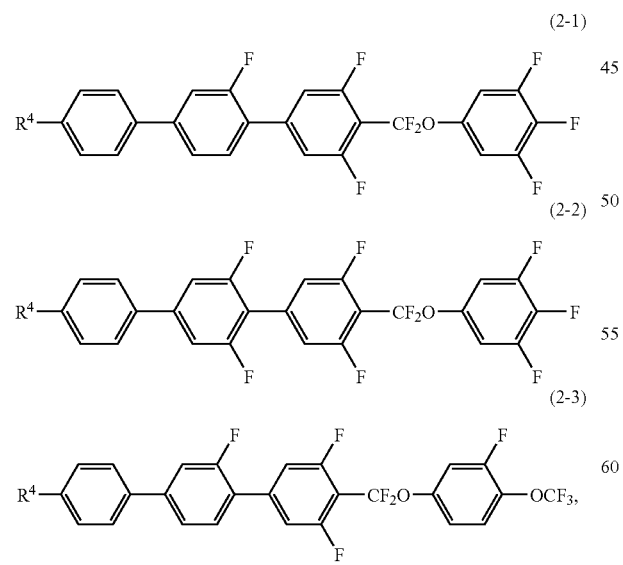

wherein $R^4$ is alkyl having 1 to 12 carbons or alkenyl having 2 to 12 carbons.

3. The liquid crystal composition according to item 2, wherein the second component is at least one compound selected from the group of compounds represented by formula (2-1).

4. The liquid crystal composition according to any one of items 1 to 3, wherein the proportion of the first component is from 5 wt % to 40 wt %, that of the second component is from 5 wt % to 30 wt % and that of the third component is from 25 wt % to 70 wt %, based on the total weight of the liquid crystal composition.

5. The liquid crystal composition according to any one of items 1 to 4, wherein the composition further includes at least one compound selected from the group of compounds represented by formulas (4-1) and (4-2) as a fourth component:

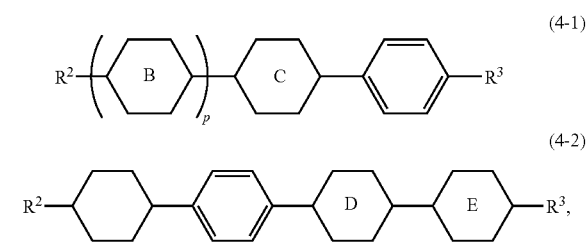

wherein $R^2$ and $R^3$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring B, ring C and ring E are each independently 1,4-cyclohexylene or 1,4-phenylene; ring D is 1,4-cyclohexylene, 1,4-phenylene, 2-fluoro-1,4-phenylene or 3-fluoro-1,4-phenylene; p is 0 or 1.

6. The liquid crystal composition according to item 5, wherein the composition further includes at least one compound selected from the group of compounds represented by formulas from (4-1-1) to (4-1-4) and from (4-2-1) to (4-2-3) as a fourth component:

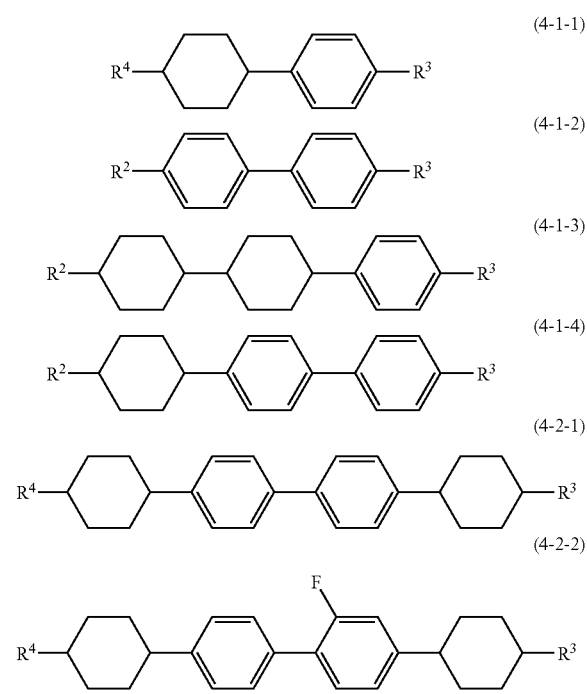

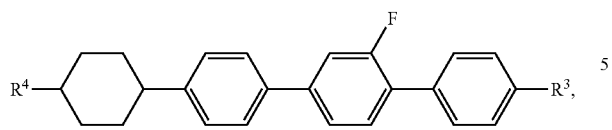
(4-2-3)

wherein $R^2$ and $R^3$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; and $R^4$ is alkyl having 1 to 12 carbons, or alkenyl having 2 to 12 carbons.

7. The liquid crystal composition according to item 6, wherein the fourth component is at least one compound selected from the group of compounds represented by formula (4-1-2).

8. The liquid crystal composition according to item 6, wherein the fourth component is at least one compound selected from the group of compounds represented by formula (4-1-3).

9. The liquid crystal composition according to item 6, wherein the fourth component is at least one compound selected from the group of compounds represented by formula (4-2-3).

10. The liquid crystal composition according to item 6, wherein the fourth component is a mixture of at least one compound selected from the group of compounds represented by formula (4-1-2) and at least one compound selected from the group of compounds represented by formula (4-1-3).

11. The liquid crystal composition according to any one of items 5 to 10, wherein the proportion of the fourth component is from 5 wt % to 50 wt % based on the total weight of the liquid crystal composition.

12. The liquid crystal composition according to any one of items 1 to 11, wherein the composition further includes at least one compound selected from the group of compounds represented by formulas (5) as a fifth component:

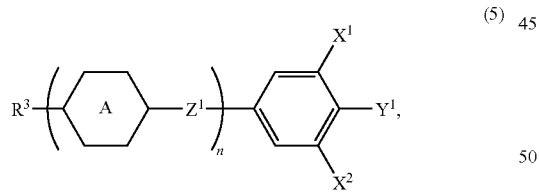
(5)

wherein $R^3$ is alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; each ring A is independently 1,4-cyclohexylene, 1,3-dioxan-2,5-diyl, 1,4-phenylene, 3-fluoro-1,4-phenylene, 3,5-difluoro-1,4-phenylene or 2,5-pyrimidine; $Z^1$ is independently a single bond, ethylene, carbonyloxy or difluoromethyleneoxy; $X^1$ and $X^2$ are each independently hydrogen or fluorine; $Y^1$ is fluorine, chlorine or trifluoromethoxy; n is 1 or 2.

13. The liquid crystal composition according to item 12, wherein the fifth component is at least one compound selected from the group of compounds represented by formulas (5-1) to (5-12):

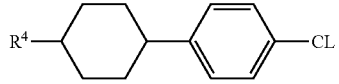
(5-1)

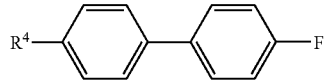
(5-2)

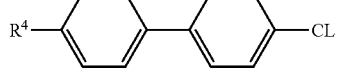
(5-3)

(5-4)

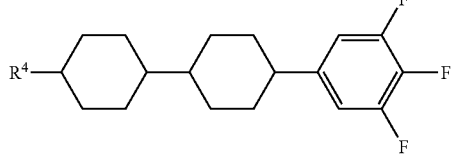
(5-5)

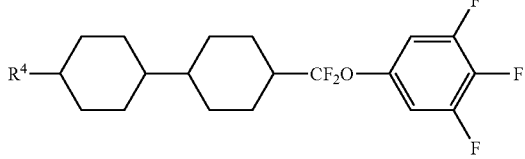
(5-6)

(5-7)

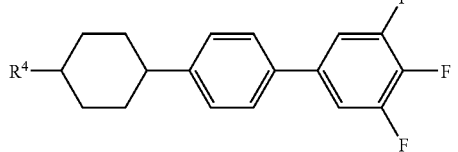
(5-8)

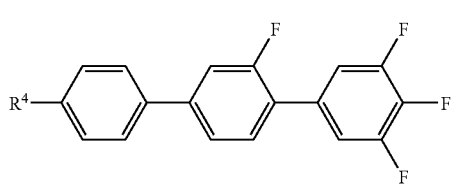
(5-9)

(5-10)

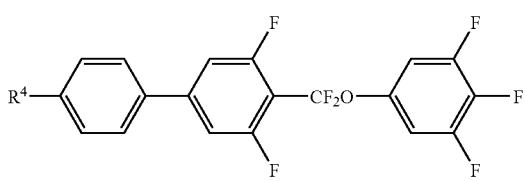
(5-11)

-continued (5-12)

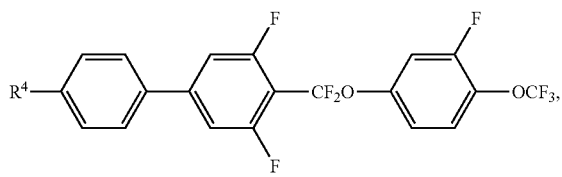

wherein R⁴ is alkyl having 1 to 12 carbons or alkenyl having 2 to 12 carbons.

14. The liquid crystal composition according to item 13, wherein the fifth component is at least one compound selected from the group of compounds represented by formula (5-6).
15. The liquid crystal composition according to item 13, wherein the fifth component is at least one compound selected from the group of compounds represented by formula (5-9).
16. The liquid crystal composition according to item 13, wherein the fifth component is at least one compound selected from the group of compounds represented by formula (5-10).
17. The liquid crystal composition according to item 13, wherein the fifth component is at least one compound selected from the group of compounds represented by formula (5-11).
18. The liquid crystal composition according to item 13, wherein the fifth component is a mixture of at least one compound selected from the group of compounds represented by formula (5-6) and at least one compound selected from the group of compounds represented by formula (5-11).
19. The liquid crystal composition according to item 13, wherein the fifth component is a mixture of at least one compound selected from the group of compounds represented by formula (5-9) and at least one compound selected from the group of compounds represented by formula (5-11).
20. The liquid crystal composition according to any one of items 12 to 19, wherein the proportion of the fifth component is from 5 wt % to 30 wt % based on the total weight of the liquid crystal composition.
21. The liquid crystal composition according to any one of items 1 to 20, wherein the composition has a maximum temperature of a nematic phase of 70° C. or more, an optical anisotropy (25° C.) of 0.08 or more at a wavelength of 589 nm, and a dielectric anisotropy (25° C.) of 2 or more at a frequency of 1 kHz.
22. A liquid crystal display device that includes the liquid crystal composition according to any one of items 1 to 21.
23. The liquid crystal display device according to item 22, which has an operation mode of TN mode, OCB mode or IPS mode, and has a driving mode of an active matrix mode.

The invention further includes: (1) a composition as described above that further contains an optically active compound, (2) a composition as described above that further contains an additive, such as an antioxidant, an ultraviolet light absorbent and/or an antifoaming agent and so on, (3) an AM device containing a composition described above, (4) a device having TN, ECB, OCB or IPS mode and containing a composition described above, (5) a transmission-type device containing a composition described above, (6) use of a composition described above as a composition having a nematic phase, and (7) use, as an optically active composition, of a composition described as above added with an optically active compound.

The composition of the invention is explained in the following order. First, the constitution of the component compounds in the composition is explained. Second, the main characteristics of the component compounds and the main effects of the compounds on the composition are explained. Third, desirable proportions of the component compounds and the basis thereof are explained. Fourth, a desirable embodiment of the component compounds is explained. Fifth, examples of the component compounds are shown. Sixth, additives that may be added to the composition are explained. Seventh, the preparation methods of the component compounds are explained. Lastly, use of the composition is explained.

First, the constitution of component compounds in the composition is explained. The composition of the invention is classified into the composition A and the composition B. The composition A may further contain another liquid crystal compound, an additive, an impurity, and so forth. Another liquid crystal compound is different from the compound (1-1), the compound (1-2), the compound (2), the compound (3), the compound (4-1), the compound (4-2) and the compound (5). Such another compound is mixed with the composition for the purpose of adjusting the characteristics thereof. Among such liquid crystal compounds, the amount of a cyano compound is desirably small from the viewpoint of stability to heat or ultraviolet light. The proportion of the cyano compound is more desirably 0 wt %. The additives include an optically active compound, an antioxidant, an ultraviolet light absorbent, a coloring matter, an antifoaming agent and so forth. The impurity is a compound and so forth incorporated in the process such as the synthesis of a component compound and so forth.

The composition B consists essentially of the compounds selected from the compound (1-1), the compound (1-2), the compound (2), the compound (3), the compound (4-1), the compound (4-2) and the compound (5). The term "essentially" means that the composition does not contain a liquid crystal compound which is different from these compounds. The term "essentially" also means that the composition may further contain an additive, an impurity, and so forth. The components of the composition B are fewer than those of the composition A. The composition B is preferable to the composition A from the viewpoint of cost reduction. The composition A is preferable to the composition B from the viewpoint of adjusting the physical characteristics by mixing with other liquid crystal compounds.

Second, the main characteristics of the component compounds and the main effects of the compounds on the characteristics of the composition will be explained. The main characteristics of the component compounds are summarized in Table 2 according to the advantages of the invention. In Table 2, the symbol L represents large or high, the symbol M represents a middle degree, and the symbol S represents small or low. The symbols L, M and S are classification based on qualitative comparison the component compounds.

TABLE 2

| Characteristics of Compounds | | | | | | | |
|---|---|---|---|---|---|---|---|
| | Compound | | | | | | |
| | (1-1) | (1-2) | (2) | (3) | (4-1) | (4-2) | (5) |
| Maximum Temperature | M | M | M | S | S-M | L | S-M |
| Viscosity | M | M | L | S | S | M | S-M |
| Optical Anisotropy | L | L | L | S | M-L | M-L | M-L |

TABLE 2-continued

Characteristics of Compounds

| | Compound | | | | | | |
|---|---|---|---|---|---|---|---|
| | (1-1) | (1-2) | (2) | (3) | (4-1) | (4-2) | (5) |
| Dielectric Anisotropy | 0 | 0 | L | 0 | 0 | 0 | M-L |
| Specific Resistance | L | L | L | L | L | L | M-L |

The main effects of the component compounds to the characteristics of the composition upon mixing the component compounds to the composition are as follows. The compound (1-1) and the compound (1-2) increase the absolute value of the optical anisotropy. The compound (2) increases the optical anisotropy and the dielectric anisotropy. The compound (3) decreases the viscosity. The compound (4-1) decreases the minimum temperature. The compound (4-2) increases the maximum temperature. The compound (5) increases the dielectric anisotropy.

Third, desirable proportions of the component compounds and the basis therefore are explained. The desirable proportion of the first component is not less than 5 wt % for increasing the optical anisotropy, and is not more than 40 wt % for decreasing the minimum temperature. A more desirable proportion is from 5 wt % to 35 wt %. A particularly desirable proportion is from 5 wt % to 30 wt %.

The desirable proportion of the second component is not less than 5 wt % for increasing the dielectric anisotropy, and is not more than 30 wt % for decreasing the viscosity. The more desirable proportion is from 5 wt % to 25 wt %. The particularly desirable proportion is from 10 wt % to 25 wt %.

The desirable proportion of the third component is not less than 25 wt % for decreasing the viscosity, and is not more than 70 wt % for decreasing the minimum temperature. The more desirable proportion is from 25 wt % to 65 wt %. The particularly desirable proportion is from 30 wt % to 65 wt %.

The fourth component is suitable for preparing a composition having a particularly small viscosity. The desirable proportion of the fourth component is from 5 wt % to 50 wt %. The more desirable proportion is from 5 wt % to 45 wt %. The particularly desirable proportion is from 5 wt % to 40 wt %.

The fifth component is suitable for preparing a composition having a particularly large dielectric anisotropy. The desirable proportion of the fifth component is from 5 wt % to 30 wt %. The more desirable proportion is from 5 wt % to 25 wt %. The particularly desirable proportion is from 5 wt % to 20 wt %.

Fourth, a desirable embodiment of the component compounds is explained. $R^1$ is alkyl having 1 to 12 carbons. $R^2$ and $R^3$ are each independently alkyl having 1 to 12 carbons, alkoxy having 1 to 12 carbons, alkenyl having 2 to 12 carbons, or alkenyl having 2 to 12 carbons of which arbitrary hydrogen is replaced by fluorine. Desirable $R^2$ is alkenyl having 2 to 12 carbons for lowering the minimum temperature or decreasing the viscosity. Desirable $R^3$ is straight alkyl having 1 to 10 carbons for increasing the stability to ultraviolet light and heat. $R^4$ is alkyl having 1 to 12 carbons or alkenyl having 2 to 12 carbons. Desirable $R^4$ is straight alkyl having 1 to 10 carbons for increasing the stability to ultraviolet light and heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. The desirable configuration of —CH═CH— in these alkenyls depends on the position of the double bond. Trans is desirable for the alkenyls such as 1-propenyl, 1-butenyl, 1-pentenyl, 1-hexenyl, 3-pentenyl and 3-hexenyl for decreasing the viscosity. Cis desirable for the alkenyl such as 2-butenyl, 2-pentenyl and 2-hexenyl. In these alkenyls, straight alkenyl is preferable to branched alkenyl.

Preferred examples of alkenyl of which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples thereof include 2,2-difluorovinyl and 4,4-difluoro-3-butenyl for decreasing the viscosity.

Ring A is 1,4-cyclohexylene, 1,3-dioxan-2,5-diyl, 1,4-phenylene, 3-fluoro-1,4-phenylene, 3,5-difluoro-1,4-phenylene or 2,5-pyrimidine, and two rings A may be identical or different when n is 2. Desirable ring A is 1,4-phenylene for increasing the optical anisotropy.

Ring B, ring C, ring E are each independently 1,4-cyclohexylene or 1,4-phenylene. Desirable ring B and ring C are each 1,4-cyclohexylene for decreasing the minimum temperature. Desirable ring E is 1,4-phenylene for increasing the optical anisotropy. Ring D is 1,4-cyclohexylene, 1,4-phenylene, 2-fluoro-1,4-phenylene or 3-fluoro-1,4-phenylene. Desirable ring D is 3-fluoro-1,4-phenylene for decreasing the minimum temperature.

$Z^1$ is a single bond, ethylene, carbonyloxy or difluoromethyleneoxy, and two $Z^1$ may be identical or different when n is 2. Desirable $Z^1$ is difluoromethyleneoxy for increasing the dielectric anisotropy.)

$X^1$, $X^2$, $X^3$ and $X^4$ are each independently fluorine or chlorine. Desirable $X^1$, $X^2$, $X^3$ and $X^4$ are each fluorine for increasing the dielectric anisotropy.

$Y^1$ is fluorine, chlorine or trifluoromethoxy. Desirable $Y^1$ is fluorine for decreasing the minimum temperature.

Fifth, examples of the component compounds are shown. In the desirable compounds described below, $R^5$ is straight alkyl having 1 to 12 carbons. $R^6$ is straight alkyl having 1 to 12 carbons or straight alkoxy having 1 to 12 carbons. $R^7$ is straight alkyl having 1 to 12 carbons or straight alkenyl having 2 to 12 carbons. $R^8$ is straight alkenyl having 2 to 12 carbons of which arbitrary hydrogen is replaced by fluorine. Among these compounds, trans is preferable to cis for the configuration of 1,4-cyclohexylene for increasing the maximum temperature.

Desirable compound (1-1) is the compound (1-1-1). Desirable compound (1-2) is the compound (1-2-1). Desirable compounds (2) are from the compound (2-1-1) to the compound (2-8). More desirable compounds (2) are the compound (2-1-1), the compound (2-2-1) and the compound (2-3-1). Particularly desirable compounds (2) are the compound (2-2-1) and the compound (2-3-1). Desirable compounds (3) are the compound (3-1-1) and the compound (3-2). More desirable compound (3) is the compound (3-1). Desirable compounds (4-1) are from the compound (4-1-1-1) to the compound (4-1-4-1). More desirable compounds (4-1) are the compound (4-1-2-1) and the compound (4-1-3-1). Desirable compounds (4-2) are from the compound (4-2-1-1) to the compound (4-2-3-1). More desirable compound (4-2) is the compound (4-2-3-1). Desirable compounds (5) are from the compound (5-1-1) to the compound (5-22). More desirable compounds (5) are the compound (5-8-1), the compound (5-9-1), the compound (5-11-1) and the compound (5-12-1). Particularly desirable compounds (5) are the compound (5-9-1) and the compound (5-11-1).
(1-1-1)
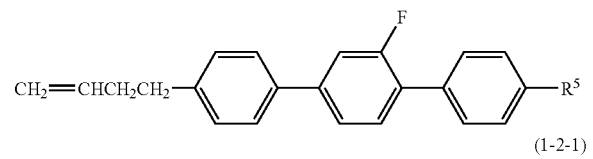
(1-2-1)
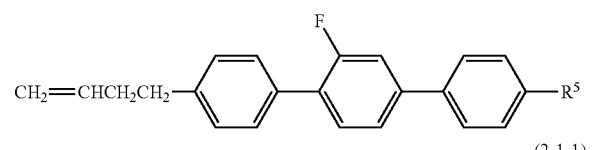
(2-1-1)
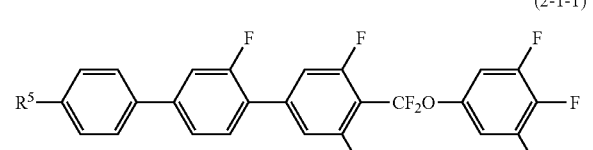
(2-2-1)
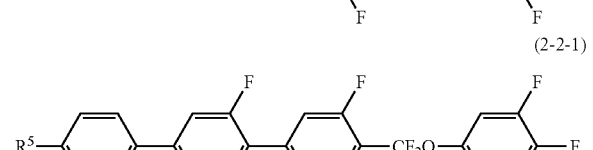
(2-3-1)
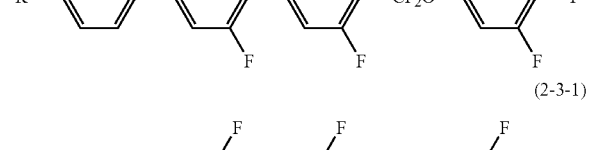
(2-4)
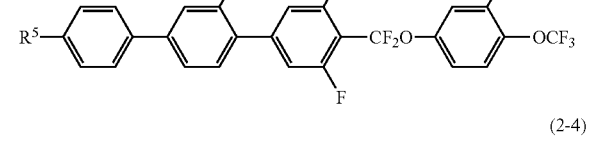
(2-5)
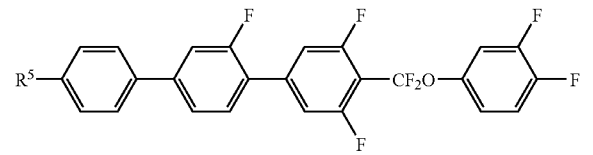
(2-6)
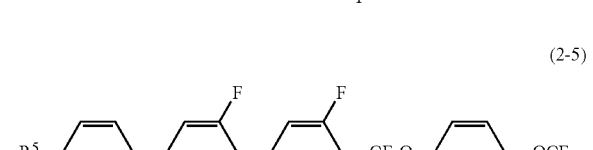
-continued
(2-7)
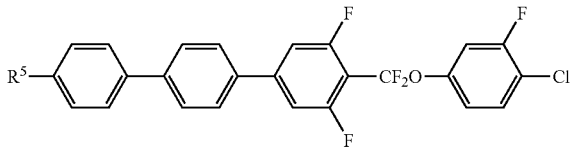
(2-8)
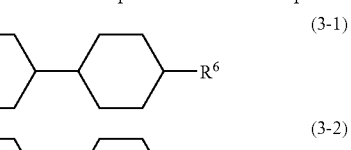
(3-1)
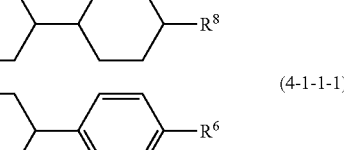
(3-2)
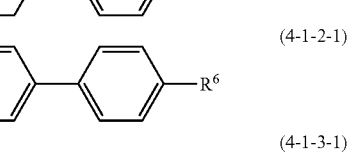
(4-1-1-1)
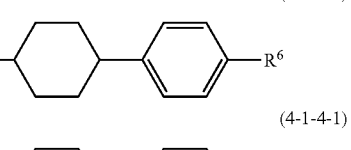
(4-1-2-1)
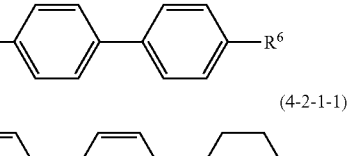
(4-1-3-1)
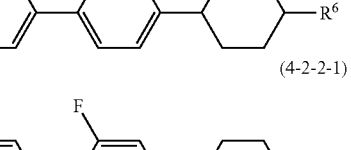
(4-1-4-1)
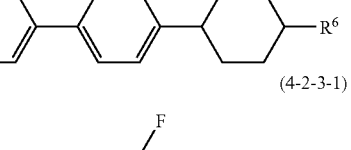
(4-2-1-1)
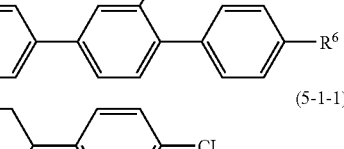
(4-2-2-1)
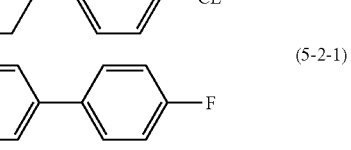
(4-2-3-1)
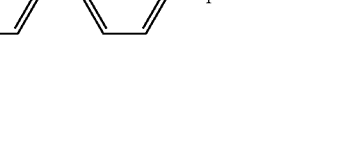
(5-1-1)
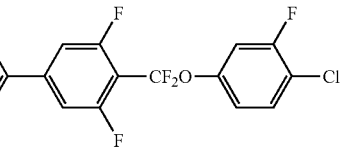
(5-2-1)
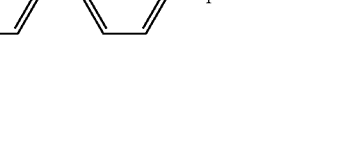

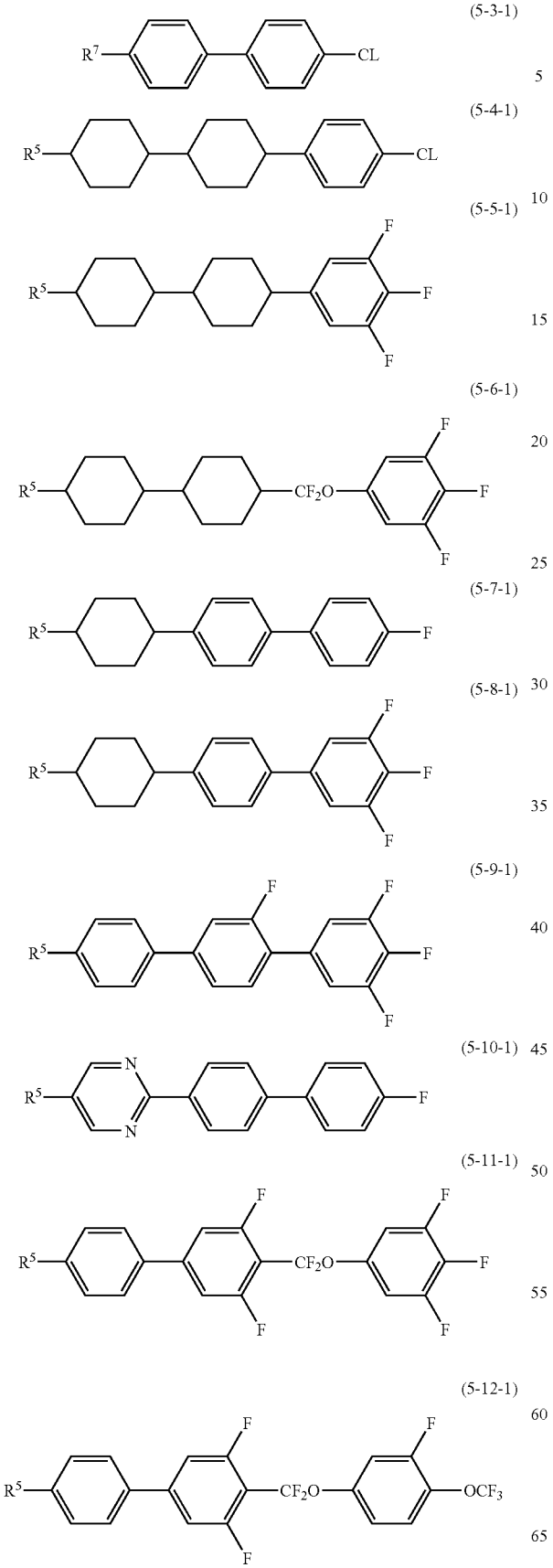
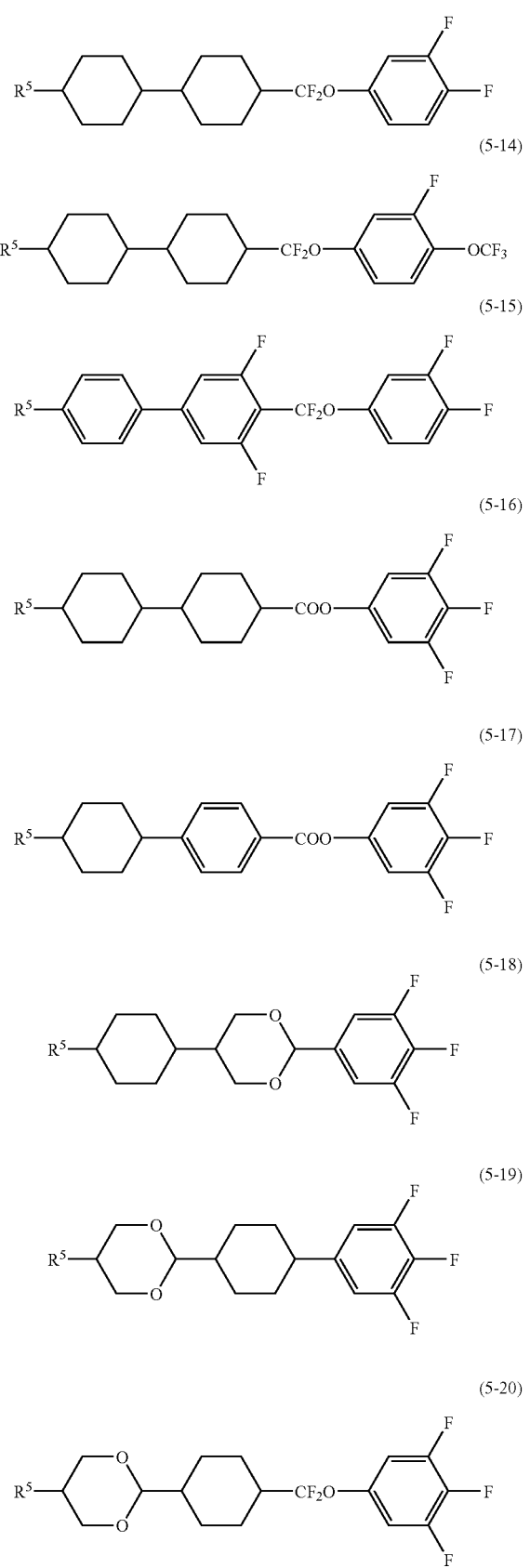

(5-21)

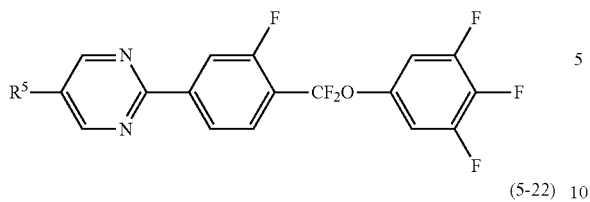

(5-22)

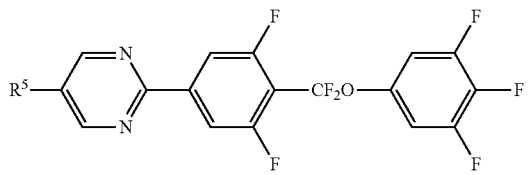

Sixth, additives that can be mixed with the composition are explained. The additives include an optically active compound, an antioxidant, an ultraviolet light absorbent, a coloring matter, an antifoaming agent and so forth. An optically active compound is mixed in the composition for inducing a helical structure of liquid crystal to provide a twist angle. Examples of the optically active compound include the compounds (6-1) to (6-4) below. The desirable proportion of the optically active compound is 5 wt % or less, and the more desirable proportion thereof ranges from 0.01 wt % to 2 wt %.

(6-1)

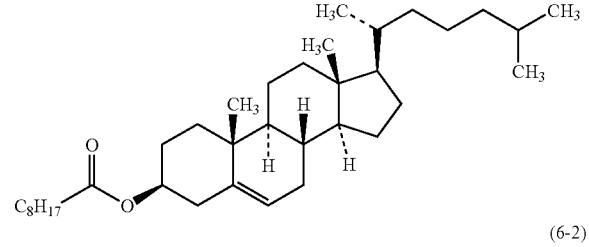

(6-2)

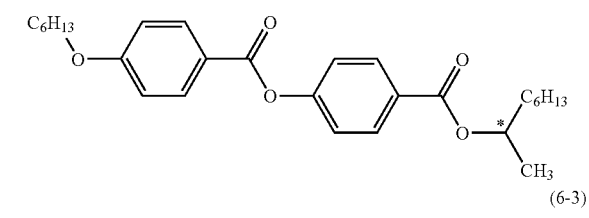

(6-3)

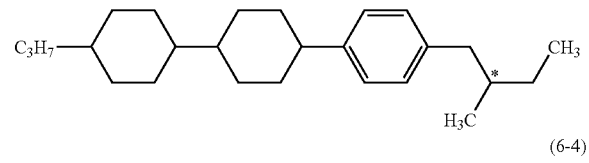

(6-4)

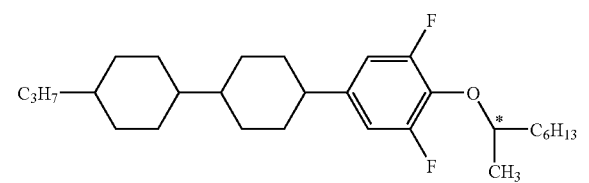

An antioxidant is mixed with the composition in order to avoid a decrease of the specific resistance caused by heating in the air, or to maintain a large voltage holding ratio at room temperature and also at a high temperature even after the device has been used for a long time.

(7)

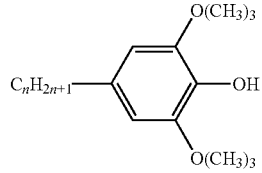

Preferred examples of the antioxidant include the compound (7), wherein n is an integer of from 1 to 9. In the compound (7), the desirable n is 1, 3, 5, 7 or 9. The more desirable n is 1 or 7. When n is 1, the compound (7) has a large volatility, and is effective in preventing a decrease of the specific resistance caused by heating in the air. When n is 7, the compound (7) has a small volatility, and is effective in maintaining a large voltage holding ratio at room temperature and also at a high temperature even after the device has been used for a long time. A desirable proportion of the antioxidant is not less than 50 ppm for obtaining the advantage thereof and is not more than 600 ppm for preventing the maximum temperature from being decreased or preventing the minimum temperature from being increased. A more desirable proportion thereof ranges from 100 ppm to 300 ppm.

Preferred examples of the ultraviolet light absorbent include benzophenone derivatives, benzoate derivatives and triazole derivatives. A light stabilizer, such as an amine having steric hindrance, is also desirable. A desirable proportion of the absorbent or the stabilizer is not less than 50 ppm for obtaining the advantage thereof and is not more than 10,000 ppm for preventing the maximum temperature from being lowered or preventing the minimum temperature from being raised. A more desirable proportion thereof ranges from 100 ppm to 10,000 ppm.

A dichroic dye such as an azo dye or an anthraquinone dye is mixed with the composition to suit for a device of a guest host (GH) mode. A desirable proportion of the dye ranges from 0.01 wt % to 10 wt %. An antifoaming agent, such as dimethyl silicone oil or methylphenyl silicone oil, is mixed with the composition for preventing foaming. The desirable proportion of the antifoaming agent is not less than 1 ppm for obtaining the advantage thereof and is not more than 1,000 ppm for preventing display failure. The more desirable proportion thereof ranges from 1 ppm to 500 ppm.

Seventh, the preparation methods of the component compounds are explained. These compounds can be prepared by known methods. The preparation methods are exemplified below. The compounds (1-1-1) and (1-2-1) are prepared by the method disclosed in JP 2006-503130. The compound (3-1) and the compound (4-1-3-1) are prepared by the method disclosed in JP H4-30382 A. The compound (4-2-3-1) is prepared by the method disclosed in JP H2-237949 A. The compound (5-5-1) and the compound (5-8-1) are prepared by the method disclosed in JP H2-233626 A. The compound (5-11-1) and the compound (5-12-1) are prepared by the method disclosed in JP H10-251186 A. The antioxidant is commercially available. The compound (7) of n=1 is available, for example, from Sigma-Aldrich Corporation. The compound (7) of n=7 is prepared by the method disclosed in U.S. Pat. No. 3,660,505.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition is explained. Most of the compositions have a minimum temperature of −10° C. or lower, a maximum temperature of 70° C. or higher, and an optical anisotropy of 0.07 to 0.20. A device containing the composition has a large voltage holding ratio. The composition is suitable for an AM device. The composition is suitable especially for an AM device of a transmission type. A composition having an optical anisotropy of 0.08 to 0.25 and further a composition having an optical anisotropy of 0.10 to 0.30 may be prepared by controlling the proportions of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an AM device or a PM device having a mode such as PC, TN, STN, ECB, OCB, IPS, VA, and so forth. It is especially desirable to use the composition for an AM device having a mode of TN, OCB or IPS. These devices may be of a reflection type, a transmission type or a semi-transmission type. It is desirable to use the composition for a device of a transmission type. The composition can be used for an amorphous silicon-TFT device or a polycrystalline silicon-TFT device. The composition is also usable for a nematic curvilinear aligned phase (NCAP) device prepared by microcapsulating the composition, and for a polymer dispersed (PD) device in which a three dimensional network polymer is formed in the composition.

EXAMPLES

When a sample was a composition, it was measured as it was, and the obtained values were recorded. When a sample was a compound, a sample for measurement was prepared by mixing 15 wt % of the compound and 85 wt % of a mother liquid crystal. A characteristic value of the compound was calculated by extrapolating from a value obtained by measurement:

(Extrapolated value)={(Value measured for the sample)−0.85×(Value measured for the mother liquid crystal)}/0.15.

When a smectic phase (or crystals) was separated out at this ratio at 25° C., the ratio of the compound to the mother liquid crystals was changed step by step in the order of 10 wt %:90 wt %, 5 wt %:95 wt % and 1 wt %:99 wt %. Values for the maximum temperature, optical anisotropy, viscosity and dielectric anisotropy of the compound were obtained by the extrapolation method.

The composition of the mother liquid crystal is shown below.

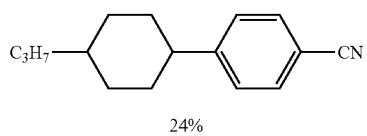

24%

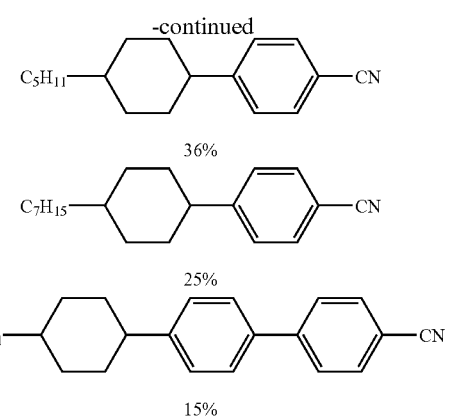

Measurements of the characteristic values were carried out with the following methods. Most methods are described in the Standard of Electric Industries Association of Japan, EIAJ•ED-2521 A, or those with some modifications.

Maximum Temperature of a Nematic Phase (NI; ° C.): A sample was placed on a hot plate in a melting point measuring apparatus equipped with a polarizing microscope and was heated at the rate of 1° C. per minute. The temperature at which a part of the sample began to change from a nematic phase to an isotropic liquid was measured. The upper limit of the temperature range of a nematic phase may be abbreviated to "a maximum temperature."

Minimum Temperature of a Nematic Phase (Tc; ° C.): A sample having a nematic phase was put in glass vials and then kept in freezers respectively at temperatures of 0° C., −10° C., −20° C., −30° C. and −40° C. for ten days, and a liquid crystal phase was observed. For example, when a sample remained in a nematic phase at −20° C. and changed to crystals or a smectic phase at −30° C., Tc was recorded as ≦−20° C. The lower limit of the temperature range of a nematic phase may be abbreviated to "a minimum temperature."

Viscosity ($\eta$, measured at 20° C., mPa·s): The viscosity was measured by means of an E-type viscometer.

Rotational Viscosity ($\gamma 1$, measured at 25° C., mPa·s): Rotational viscosity was measured with the method disclosed in M. Imai, et al., *Molecular Crystals and Liquid Crystals*, Vol. 259, p. 37 (1995). A sample was placed in a device, in which the twist angle was 0° and the cell gap between the two glass substrates was 5 μm. The TN device was applied with a voltage in the range of from 16 V to 19.5 V stepwise by 0.5 V. After a period of 0.2 second without application of voltage, voltage application was repeated with only one rectangular wave (rectangular pulse of 0.2 second) followed by no voltage application (2 seconds). The peak current and the peak time of the transient current generated by the voltage application were measured. The rotational viscosity was obtained from the measured values and the calculation equation (8) in the literature by M. Imai, et al., p. 40. The value of the dielectric anisotropy necessary for the calculation was measured by the method described below with the device for measuring the rotational viscosity.

Optical Anisotropy (refractive anisotropy Δn, measured at 25° C.): Measurement was carried out with an Abbe refractometer mounting a polarizing plate on the ocular using a light at a wavelength of 589 nm. The surface of the main prism was rubbed in one direction, and then a sample was dropped on the main prism. The refractive index $n_\parallel$ was measured when the direction of a polarized light was parallel to that of the rubbing. The refractive index $n_\perp$ was measured when the direction of a polarized light was perpendicular to that of the rubbing. The value of the optical anisotropy was calculated from the equation: $\Delta n = n_{\parallel} - n_{\perp}$.

Dielectric Anisotropy ($\Delta \in$, measured at 25° C.): A sample was charged in a TN device having a distance (cell gap) of 9 μm between the two glass substrates and a twist angle of 80° C. A sine wave (10 V, 1 kHz) was applied to the device, and after two seconds, the dielectric constant $\in_{\parallel}$ in the major axis direction of the liquid crystal molecule was measured. Another sine wave (0.5 V, 1 kHz) was applied to the device, and after two seconds, the dielectric constant $\in_{\perp}$ in the minor axis direction of the liquid crystal molecule was measured. The value of the dielectric anisotropy was calculated from the equation: $\Delta \in = \in_{\parallel} - \in_{\perp}$.

Threshold Voltage (Vth, measured at 25° C., V): Measurement was carried out with LCD Evaluation System Model LCD-5100 made by Otsuka Electronics Co., Ltd. The light source was a halogen lamp. A sample was poured into a TN device of a normally black mode, in which the cell gap between the two glass substrates was (0.45/Δn) μm and the twist angle was 80°. The voltage applied to the device (32 Hz, rectangular wave) was increased stepwise by 0.02 V starting from 0 V up to 10 V. During the stepwise increasing, the device was irradiated by light in a perpendicular direction, and the magnitude of the light passing the device was measured. A voltage-transmission curve was then prepared, in which the maximum magnitude of light corresponded to 100% transmittance and the minimum magnitude of light corresponded to 0% transmittance. The threshold voltage is the value at 90% transmittance.

Voltage Holding Ratio (VHR-1, measured at 25° C., %): The TN device used for the measurement has a polyimide alignment film, and the cell gap between the two glass substrates is 5 μm. A sample was poured into the device, and then the device was sealed with an adhesive which is polymerized by the irradiation of ultraviolet light. The TN device was applied and charged with a pulse voltage (60 microseconds at 5 V). The voltage decay was measured for 16.7 milliseconds with a High Speed Voltmeter, and the area A between the voltage curve and the horizontal axis in a unit cycle was obtained. The voltage holding ratio is the ratio of the area A to an area B that was the area at the moment without decay.

Voltage Holding Ratio (VHR-2, measured at 80° C., %): The TN device used for measurement has a polyimide alignment film, and the cell gap between the two glass substrates is 5 μm. A sample was poured into the device, and then the device was sealed with an adhesive which is polymerized by the irradiation of ultraviolet light. The TN device was applied and charged with a pulse voltage (60 microseconds at 5 V). The voltage decay was measured for 16.7 milliseconds with a High Speed Voltmeter, and the area A between the voltage curve and the horizontal axis in a unit cycle was obtained. The voltage holding ratio is the ratio of the area A to the area B that was the area at the moment without decay.

Voltage Holding Ratio (VHR-3, measured at 25° C., %): After irradiation with ultraviolet light, a voltage holding ratio was measured to evaluate the stability to ultraviolet light. A composition having a large VHR-3 has a large stability to ultraviolet light. The TN device used for measurement has a polyimide alignment film, and the cell gap is 5 μm. A sample was poured into the device, and then the device was irradiated with light for 20 minutes. The light source was an ultrahigh voltage mercury lamp USH-500D (produced by Ushio, Inc.), and the distance between the device and the light source is 20 cm. In the measurement of VHR-3, the voltage decay was measured for 16.7 milliseconds. VHR-3 is desirably 90% or more, and more desirably 95% or more.

Voltage Holding Ratio (VHR-4, measured at 25° C., %): A voltage holding ratio was measured after heating an TN device having a sample poured therein in a constant-temperature bath at 80° C. for 500 hours to evaluate the stability to heat. A composition having a large VHR-4 has a large stability to the heat. In the measurement of VHR-4, the voltage decay was measured for 16.7 milliseconds.

Response Time ($\tau$, measured at 25° C., ms): The measurement was carried out with an LCD Evaluation System Model LCD-5100 made by Otsuka Electronics Co., Ltd. The light source is a halogen lamp. The low-pass filter was set at 5 kHz. A sample was poured into a TN device of a normally white mode, in which the cell gap between the two glass substrates was 5 μm and the twist angle was 80°. A rectangular wave (60 Hz, 5 V, 0.5 second) were applied to the device. During the application, the device was irradiated with light in a perpendicular direction, and the magnitude of the light passing the device was measured. The maximum magnitude of light corresponded to 100% transmittance, and the minimum magnitude of light corresponded to 0% transmission. The rise time ($\tau_r$) is the period of time required for the change in transmittance from 90% to 10%, and the fall time ($\tau_f$) is the period of time required for the change in transmittance from 10% to 90%. The response time is the sum of the rise time and the fall time thus obtained.

Specific Resistance ($\rho$, measured at 25° C.; Ω·cm): 1.0 mL of a sample was poured in a vessel equipped with electrodes. A direct current voltage of 10 V was applied to the vessel, and after 10 second from the voltage application, the direct electric current was measured. The specific resistance was calculated by the equation: (specific resistance)={(voltage)×(electric capacity of vessel)}/[(direct electric current)×(dielectric constant of vacuum)].

Gas Chromatographic Analysis: A Gas Chromatograph Model GC-14B made by Shimadzu was used for measurement. The carrier gas was helium (2 milliliters per minute). The evaporator and the detector (FID) were set up at 280° C. and 300° C., respectively. A capillary column DB-1 (length 30 meters, bore 0.32 millimeter, film thickness 0.25 micrometer, dimethylpolysiloxane as stationary phase, no polarity) made by Agilent Technologies, Inc. was used for the separation of the component compounds. After the column was kept at 200° C. for 2 minutes, it was further heated to 280° C. at a rate of 5° C. per minute. A sample was prepared in an acetone solution (0.1 wt %), and 1 microliter of the solution was injected into the evaporator. The recorder used was Chromatopac Model C-R5A made by Shimadzu or its equivalent. The gas chromatogram obtained showed a retention time of a peak and a peak area corresponding to the component compound.

Solvents for diluting the sample may also be chloroform, hexane, and so forth. The following capillary columns may also be used for the separation of the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). In order to prevent compound peaks from overlapping, a capillary column CBP1-M50-025 (length 50 meters, bore 0.25 millimeter, film thickness 0.25 micrometer) made by Shimadzu Corporation may be used.

The proportions of the liquid crystal compounds contained in the composition can be calculated in the following manner. A liquid crystal compound can be detected by gas chromatography. The area proportion of the corresponding peak in the gas chromatogram corresponds to the proportion (molar number) of the liquid crystal compound. In the case where the aforementioned capillary columns are used, correction coefficients of the liquid crystal compounds can be regarded as 1. Accordingly, the proportions (wt %) of the liquid crystal compounds can be calculated from the area proportions of the peaks.

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene is trans. The parenthesized number next to the symbolized compounds in the Examples corresponds to the number of the desirable compound. The symbol (–) means other liquid crystal compound. The proportion of a liquid crystal compound is a percentage by weight (wt %) based on the total weight of the liquid crystal composition. The liquid crystal composition further contains an impurity. Last, the characteristics of the composition are summarized.

TABLE 3

Method of Description of Compound using Symbols
R-(A$_1$)-Z$_1$- . . . -Z$_n$-(A$_n$)-R'

| 1) Left Terminal Group R- | Symbol |
| --- | --- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |

| 2) Right Terminal Group -R | Symbol |
| --- | --- |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —CH=CF$_2$ | —VFF |
| —F | —F |
| —Cl | —CL |
| —OCF$_3$ | —OCF3 |

| 3) Bonding group -Z$_n$- | Symbol |
| --- | --- |
| —C$_2$H$_4$— | 2 |
| —COO— | E |
| —CH=CH— | V |
| —C≡C— | T |
| —CF$_2$O— | X |

| 4) Ring Structure -A$_n$- | Symbol |
| --- | --- |
|  | H |
| 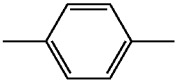 | B |
| 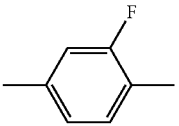 | B(F) |

TABLE 3-continued

Method of Description of Compound using Symbols
R-(A$_1$)-Z$_1$- . . . -Z$_n$-(A$_n$)-R'

| | |
| --- | --- |
| 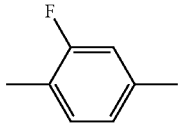 | B(2F) |
| 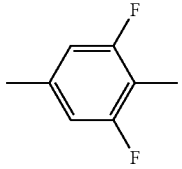 | B(F,F) |
| 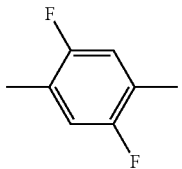 | B(2F,5F) |
| 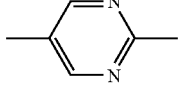 | Py |
| 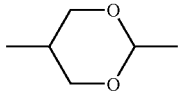 | G |

5) Example of Description

Example 1
V2—BB(F)B-1

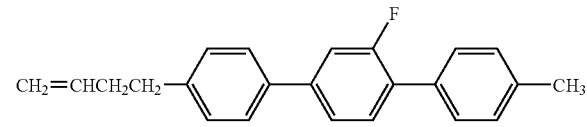

Example 2
3-HB—CL

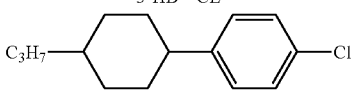

Example 3
5-HBB(F)B-3

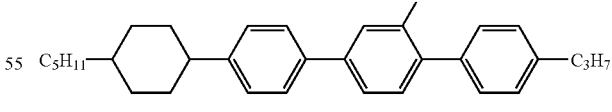

Example 4
3-BB(F,F)XB(F)—OCF3

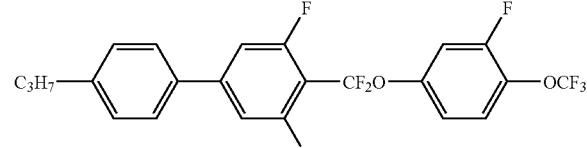

Comparative Example 1

Example 95 was chosen from the compositions disclosed in JP 2005-007775 A. The reason is that the composition contains the compounds (1-2), the compounds (3), the compounds (4-1) and the compounds (5) and is smallest in the rotational viscosity. The components and characteristics of the composition were as follows.

| | | |
|---|---|---|
| 2-HHB—OCF3 | (5) | 4% |
| 3-HHB—OCF3 | (5) | 4% |
| 2-BB(F)B(F,F)—F | (5-9-1) | 2% |
| 3-BB(F)B(F,F)—F | (5-9-1) | 4% |
| 2-BB(F,F)XB(F,F)—F | (5-11-1) | 5% |
| 3-BB(F,F)XB(F,F)—F | (5-11-1) | 6% |
| 3-HH—V1 | (3-1) | 13% |
| 4-HH—V | (3-1) | 16% |
| V—HHB-1 | (4-1-3-1) | 16% |
| V—HHB(F)—F | (5) | 8% |
| 3-HB—O1 | (4-1-1-1) | 12% |
| 2-BB(F)B-3 | (—) | 5% |
| V2-BB(2F)B-2 | (1-2-1) | 5% |

NI = 75.0° C., Δn = 0.109, Vth = 1.88 V, γ1 = 59 mPa·s.

Example 1

The composition of Example 1 had a smaller rotational viscosity as compared to that of Comparative Example 1.

| | | |
|---|---|---|
| V2-BB(F)B-1 | (1-1-1) | 7% |
| V2-BB(F)B-2 | (1-1-1) | 8% |
| V2-BB(F)B-3 | (1-1-1) | 8% |
| 3-BB(F)B(F,F)XB(F,F)—F | (2-1-1) | 2% |
| 4-BB(F)B(F,F)XB(F,F)—F | (2-1-1) | 6% |
| 5-BB(F)B(F,F)XB(F,F)—F | (2-1-1) | 4% |
| 3-HH—V | (3-1) | 47% |
| 3-HH—V1 | (3-1) | 8% |
| V—HHB-1 | (4-1-3-1) | 5% |
| 3-BB(F,F)XB(F,F)—F | (5-11-1) | 5% |

NI = 79.2° C., Tc ≦ −20° C., Δn = 0.124, Δε = 2.8, Vth = 2.42 V, γ1 = 39.9 mPa·s, τ = 6.1 ms, VHR-1 = 99.1%, VHR-2 = 98.2%, VHR-3 = 98.1%.

Example 2

The composition of Example 2 had a smaller rotational viscosity as compared to that of Comparative Example 1.

| | | |
|---|---|---|
| V2-BB(2F)B-1 | (1-2-1) | 7% |
| V2-BB(2F)B-2 | (1-2-1) | 5% |
| V2-BB(2F)B-3 | (1-2-1) | 8% |
| 4-BB(F)B(F,F)XB(F,F)—F | (2-1-1) | 4% |
| 3-BB(F,F)B(F,F)XB(F,F)—F | (2-2-1) | 3% |
| 3-BB(F)B(F,F)XB(F)—OCF3 | (2-3-1) | 4% |
| 3-BBB(F,F)XB(F)—CL | (2-7) | 3% |
| 3-BBB(F,F)XB(F,F)—F | (2-7) | 3% |
| 2-HH-3 | (3-1) | 5% |
| 3-HH—V | (3-1) | 42% |
| 3-HH—V1 | (3-1) | 11% |
| V2-HHB-1 | (4-1-3-1) | 5% |

NI = 85.1° C., Tc ≦ −20° C., Δn = 0.124, Δε = 2.8, Vth = 2.50 V, γ1 = 40.5 mPa·s, τ = 6.1 ms, VHR-1 = 99.2%, VHR-2 = 98.3%, VHR-3 = 98.2%.

Example 3

The composition of Example 3 had a smaller rotational viscosity as compared to that of Comparative Example 1.

| | | |
|---|---|---|
| V2-BB(F)B-1 | (1-1-1) | 7% |
| V2-BB(2F)B-1 | (1-2-1) | 7% |
| V2-BB(2F)B-2 | (1-2-1) | 4% |
| 5-BB(F)B(F,F)XB(F,F)—F | (2-1-1) | 5% |
| 3-HH-4 | (3-1) | 5% |
| 5-HH—V | (3-1) | 5% |
| 3-HH—VFF | (3-2) | 37% |
| 3-HB—O2 | (4-1-1-1) | 3% |
| 3-HBB-2 | (4-1-4-1) | 3% |
| 1V—HBB-2 | (4-1-4-1) | 4% |
| 5-HBB(F)B-3 | (4-2-3-1) | 3% |
| 3-HB—CL | (5-1-1) | 3% |
| 3-HHB(F,F)—F | (5-5-1) | 3% |
| 3-HHXB(F,F)—F | (5-6-1) | 3% |
| 3-HBB(F)—F | (5-8-1) | 5% |
| 3-BB(F,F)XB(F)—OCF3 | (5-12-1) | 3% |

NI = 78.4° C., Tc ≦ −20° C., Δn = 0.126, Δε = 3.1, Vth = 2.35 V, γ1 = 47.7 mPa·s, τ = 6.5 ms, VHR-1 = 99.0%, VHR-2 = 98.1%, VHR-3 = 97.9%.

Example 4

| | | |
|---|---|---|
| V2-BB(F)B-1 | (1-1-1) | 6% |
| V2-BB(F)B-2 | (1-1-1) | 7% |
| V2-BB(F)B-3 | (1-1-1) | 8% |
| 4-BB(F)B(F,F)XB(F,F)—F | (2-1-1) | 8% |
| 5-BB(F)B(F,F)XB(F,F)—F | (2-1-1) | 5% |
| 3-HH—V | (3-1) | 40% |
| 3-HH—V1 | (3-1) | 5% |
| V2-BB-1 | (4-1-2-1) | 5% |
| 3-HB—CL | (5-1-1) | 4% |
| 1V2-BB—F | (5-2-1) | 4% |
| 1V2-BB—CL | (5-3-1) | 3% |
| 3-HBB—F | (5-7-1) | 5% |

NI = 70.2° C., Tc ≦ −20° C., Δn = 0.134, Δε = 2.9, Vth = 2.39 V, γ1 = 36.9 mPa·s, τ = 5.7 ms, VHR-1 = 98.9%, VHR-2 = 98.1%, VHR-3 = 97.9%.

Example 5

| | | |
|---|---|---|
| V2-BB(F)B-1 | (1-1-1) | 6% |
| 3-BB(F)B(F,F)XB(F,F)—F | (2-1-1) | 3% |
| 4-BB(F)B(F,F)XB(F,F)—F | (2-1-1) | 5% |
| 5-BB(F)B(F,F)XB(F,F)—F | (2-1-1) | 4% |
| 3-HH—V | (3-1) | 48% |
| 3-HH—V1 | (3-1) | 9% |
| 7-HB-1 | (4-1-1-1) | 3% |
| 3-HHB-1 | (4-1-3-1) | 4% |
| 3-HHB—CL | (5-4-1) | 3% |
| 3-BB(F)B(F,F)—F | (5-9-1) | 3% |
| 3-PyBB—F | (5-10-1) | 4% |
| 4-PyBB—F | (5-10-1) | 4% |
| 5-PyBB—F | (5-10-1) | 4% |

NI = 81.3° C., Tc ≦ −20° C., Δn = 0.114, Δε = 3.0, Vth = 2.36 V, γ1 = 49.8 mPa·s, τ = 6.7 ms, VHR-1 = 99.1%, VHR-2 = 98.1%, VHR-3 = 98.1%.

Example 6

| | | |
|---|---|---|
| V2-BB(F)B-1 | (1-1-1) | 5% |
| V2-BB(2F)B-1 | (1-2-1) | 5% |

-continued

| | | |
|---|---|---|
| 3-BB(F)B(F,F)XB(F)—F | (2-4) | 3% |
| 4-BB(F)B(F,F)XB—OCF3 | (2-5) | 3% |
| 4-BB(F)B(F,F)XB(F)—OCF3 | (2-6) | 4% |
| 3-HH—V | (3-1) | 47% |
| 3-HH—V1 | (3-1) | 8% |
| 1V2-BB-1 | (4-1-2-1) | 6% |
| 5-HBB(2F)H-3 | (4-2-2-1) | 4% |
| 3-BB(F,F)XB(F)—F | (5-15) | 7% |
| 3-HHEB(F,F)—F | (5-16) | 5% |
| 3-HBEB(F,F)—F | (5-17) | 3% |

NI = 72.7° C., Tc ≤ −20° C., Δn = 0.110, Δε = 3.0, Vth = 2.34 V, γ1 = 49.1 mPa·s, τ = 6.7 ms, VHR-1 = 99.2%, VHR-2 = 98.2%, VHR-3 = 98.2%.

Example 7

| | | |
|---|---|---|
| V2-BB(2F)B-1 | (1-2-1) | 6% |
| V2-BB(2F)B-2 | (1-2-1) | 6% |
| V2-BB(2F)B-3 | (1-2-1) | 6% |
| 4-BB(F)B(F,F)XB(F,F)—F | (2-1-1) | 6% |
| 5-BB(F)B(F,F)XB(F,F)—F | (2-1-1) | 3% |
| 3-HH—V | (3-1) | 47% |
| 3-HH—V1 | (3-1) | 7% |
| V2-BB-1 | (4-1-2-1) | 5% |
| 3-HGB(F,F)—F | (5-18) | 3% |
| 5-GHB(F,F)—F | (5-19) | 4% |
| 5-GHXB(F,F)—F | (5-20) | 4% |
| 3-HHBB(F,F)—F | (—) | 3% |

NI = 73.8° C., Tc ≤ −20° C., Δn = 0.113, Δε = 3.2, Vth = 2.30 V, γ1 = 43.2 mPa·s, τ = 6.3 ms, VHR-1 = 99.0%, VHR-2 = 98.2%, VHR-3 = 98.1%.

Example 8

| | | |
|---|---|---|
| V2-BB(F)B-1 | (1-1-1) | 7% |
| V2-BB(F)B-3 | (1-1-1) | 4% |
| 3-BB(F,F)B(F,F)XB(F,F)—F | (2-2-1) | 3% |
| 3-BBB(F,F)XB(F)—CL | (2-7) | 3% |
| 3-BBB(F,F)XB(F,F)—F | (2-8) | 3% |
| 3-HH—V | (3-1) | 47% |
| 3-HH—V1 | (3-1) | 8% |
| V2-BB-1 | (4-1-2-1) | 6% |
| V—HHB-1 | (4-1-3-1) | 3% |
| 5-HBBH—3 | (4-2-1-1) | 3% |
| 5-PyB(F)XB(F,F)—F | (5-21) | 5% |
| 5-PyB(F,F)XB(F,F)—F | (5-22) | 5% |
| 1O1-HBBH-5 | (—) | 3% |

NI = 78.3° C., Tc ≤ −20° C., Δn = 0.112, Δε = 3.1, Vth = 2.35 V, γ1 = 42.9 mPa·s, τ = 6.2 ms, VHR-1 = 99.0%, VHR-2 = 98.1%, VHR-3 = 98.2%.

Example 9

| | | |
|---|---|---|
| V2-BB(F)B-1 | (1-1-1) | 7% |
| V2-BB(F)B-2 | (1-1-1) | 4% |
| V2-BB(F)B-3 | (1-1-1) | 7% |
| 3-BB(F)B(F,F)XB(F,F)—F | (2-1-1) | 3% |
| 4-BB(F)B(F,F)XB(F,F)—F | (2-1-1) | 6% |
| 5-BB(F)B(F,F)XB(F,F)—F | (2-1-1) | 5% |
| 3-HH—V | (3-1) | 45% |
| 3-HH—V1 | (3-1) | 8% |
| 1V2-BB—F | (5-2-1) | 3% |
| 1V2-BB—CL | (5-3-1) | 3% |
| 3-HHXB(F)—F | (5-13) | 3% |
| 3-HHXB(F)—OCF3 | (5-14) | 3% |
| 3-HHEBH-3 | (—) | 3% |

NI = 81.3° C., Tc ≤ −20° C., Δn = 0.122, Δε = 2.8, Vth = 2.45 V, γ1 = 48.3 mPa·s, τ = 6.6 ms, VHR-1 = 99.1%, VHR-2 = 98.1%, VHR-3 = 98.1%.

Example 10

| | | |
|---|---|---|
| V2-BB(F)B-1 | (1-1-1) | 7% |
| 4-BB(F)B(F,F)XB(F,F)—F | (2-1-1) | 5% |
| 5-BB(F)B(F,F)XB(F,F)—F | (2-1-1) | 5% |
| 3-BB(F)B(F,F)XB(F)—OCF3 | (2-3-1) | 4% |
| 3-HH—V | (3-1) | 46% |
| 3-HH—V1 | (3-1) | 10% |
| V2-BB-1 | (4-1-2-1) | 8% |
| V—HHB-1 | (4-1-3-1) | 7% |
| 5-HBB(F)B-2 | (4-2-3-1) | 3% |
| 3-BB(F,F)XB(F,F)—F | (5-11-1) | 5% |

NI = 73.2° C., Tc ≤ −20° C., Δn = 0.110, Δε = 2.9, Vth = 2.40 V, γ1 = 37.5 mPa·s, τ = 5.8 ms, VHR-1 = 99.2%, VHR-2 = 98.2%, VHR-3 = 98.2%.

UTILITY IN THE INDUSTRY

The large dielectric anisotropy of the liquid crystal composition of the invention contributes to a low threshold voltage, a small electric power consumption and a large contrast ratio of the device. A large specific resistance of the composition at room temperature and also at a high temperature in the initial stage contributes to a large voltage holding ratio and a large contrast ratio of the device. As the composition has a large specific resistance at room temperature and also at a high temperature after it has been used for a long time, the composition has a high stability to ultraviolet light and heat, and the liquid crystal display device has a long service life. The composition having these characteristics can be preferably used for an AM device used in a liquid crystal projector, a liquid crystal television and so forth.

What is claimed is:

1. A liquid crystal composition having a nematic phase, including a first component as at least one compound selected from the group of compounds represented by formula (I-1) and formula (I-2), a second component as at least one compound selected from the group of compounds represented by formula (2), and a third component as at least one compound selected from the group of compounds represented by formula (3):

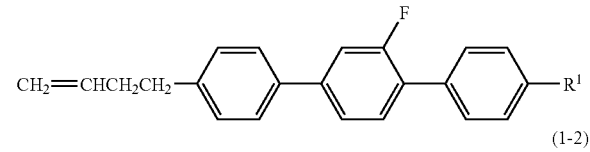

(1-1)

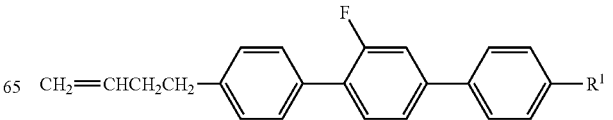

(1-2)

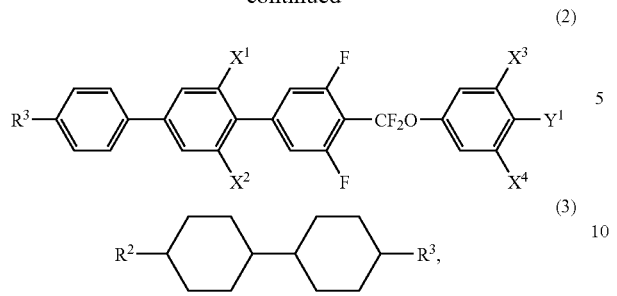

(2)

(3)

wherein $R^1$ is alkyl having 1 to 12 carbons, $R^2$ and $R^3$ are each independently alkyl having 1 to 12 carbons, alkoxy having 1 to 12 carbons, alkenyl having 2 to 12 carbons, or alkenyl having 2 to 12 carbons of which arbitrary hydrogen is replaced by fluorine; $X^1$, $X^2$, $X^3$ and $X^4$ are each independently hydrogen or fluorine; and $Y^1$ is fluorine, chlorine or trifluoromethoxy.

2. The liquid crystal composition according to claim 1, wherein the second component is at least one compound selected from the group of compounds represented by formula from (2-1) to (2-3):

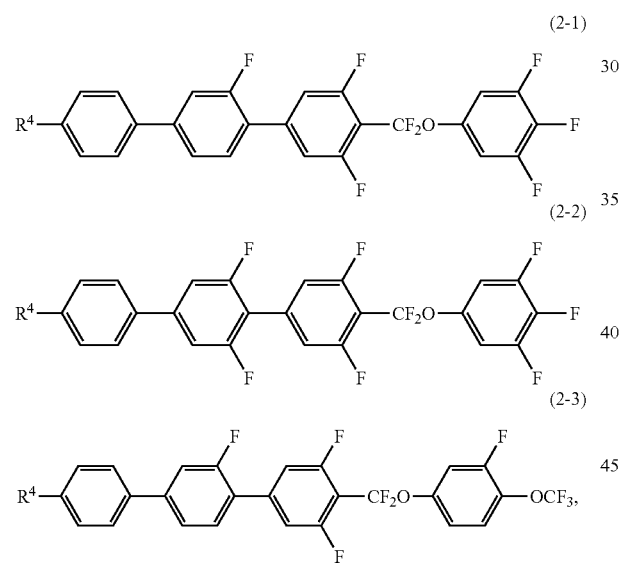

(2-1)

(2-2)

(2-3)

wherein $R^4$ is alkyl having 1 to 12 carbons or alkenyl having 2 to 12 carbons.

3. The liquid crystal composition according to claim 2, wherein the second component is at least one compound selected from the group of compounds represented by formula (2-1).

4. The liquid crystal composition according to claim 1, wherein a proportion of the first component is from 5 wt % to 40 wt %, a proportion of the second component is from 5 wt % to 30 wt %, and a proportion of the third component is from 25 wt % to 70 wt % based on a total weight of the liquid crystal composition.

5. The liquid crystal composition according to claim 1, further including at least one compound selected from the group of compounds represented by formulas (4-1) and (4-2) as a fourth component:

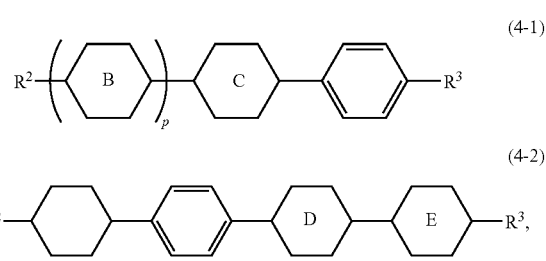

(4-1)

(4-2)

wherein $R^2$ and $R^3$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring B, ring C and ring E are each independently 1,4-cyclohexylene or 1,4-phenylene; ring D is 1,4-cyclohexylene, 1,4-phenylene, 2-fluoro-1,4-phenylene or 3-fluoro-1,4-phenylene; and p is 0 or 1.

6. The liquid crystal composition according to claim 5, further including at least one compound selected from the group of compounds represented by formulas (4-1-1) to (4-1-4) and (4-2-1) to (4-2-3) as a fourth component:

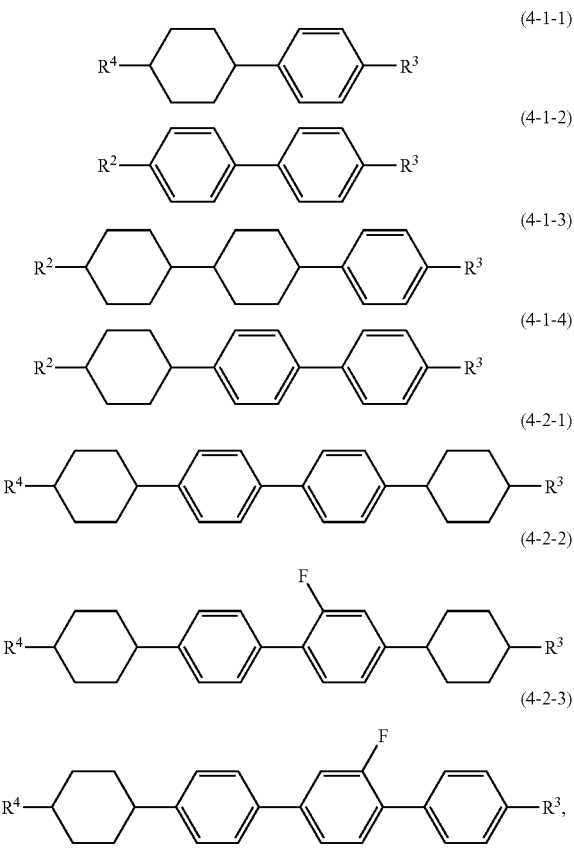

(4-1-1)

(4-1-2)

(4-1-3)

(4-1-4)

(4-2-1)

(4-2-2)

(4-2-3)

wherein $R^2$ and $R^3$ are each independently alkyl having 1 to 12 carbons, alkoxy having 1 to 12 carbons, alkenyl having 2 to 12 carbons, or alkenyl having 2 to 12 carbons of which arbitrary hydrogen is replaced by fluorine; and $R^4$ is alkyl having 1 to 12 carbons, or alkenyl having 2 to 12 carbons.

7. The liquid crystal composition according to claim 6, wherein the fourth component is at least one compound selected from the group of compounds represented by formula (4-1-2).

8. The liquid crystal composition according to claim 6, wherein the fourth component is at least one compound selected from the group of compounds represented by formula (4-1-3).

9. The liquid crystal composition according to claim 6, wherein the fourth component is at least one compound selected from the group of compounds represented by formula (4-2-3).

10. The liquid crystal composition according to claim 6, wherein the fourth component is a mixture of at least one compound selected from the group of compounds represented by formula (4-1-2) and at least one compound selected from the group of compounds represented by formula (4-1-3).

11. The liquid crystal composition according to claim 5, wherein a proportion of the fourth component is from 5 wt % to 50 wt % based on a total weight of the liquid crystal composition.

12. The liquid crystal composition according to claim 1, further including at least one compound selected from the group of compounds represented by formula (5) as a fifth component:

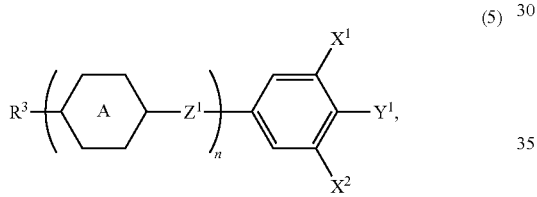

(5)

wherein $R^3$ is alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring A is independently 1,4-cyclohexylene, 1,3-dioxan-2,5-diyl, 1,4-phenylene, 3-fluoro-1,4-phenylene, 3,5-difluoro-1,4-phenylene or 2,5-pyrimidine; $Z^1$ is independently a single bond, ethylene, carbonyloxy or difluoromethyleneoxy; $X^1$ and $X^2$ are each independently hydrogen or fluorine; $Y^1$ is fluorine, chlorine or trifluoromethoxy; and n is 1 or 2.

13. The liquid crystal composition according to claim 12, wherein the fifth component is at least one compound selected from the group of compounds represented by formula (5-1) to (5-12):

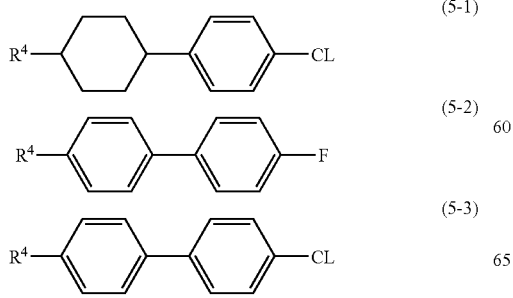

(5-1)
(5-2)
(5-3)

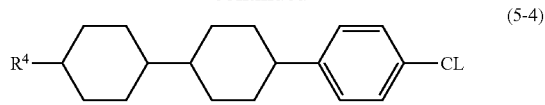

(5-4)

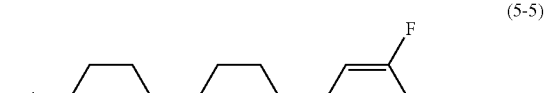

(5-5)

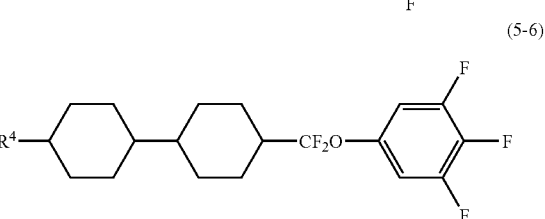

(5-6)

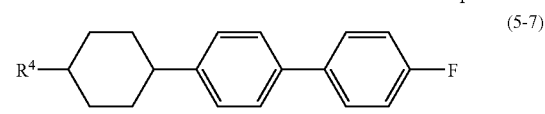

(5-7)

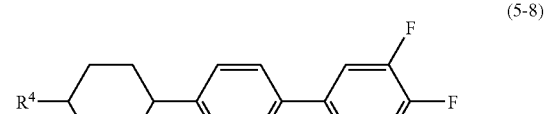

(5-8)

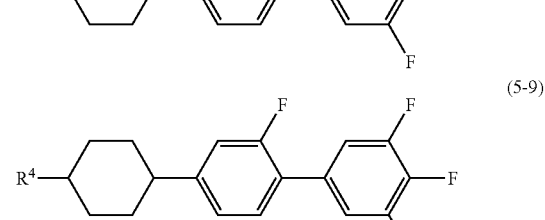

(5-9)

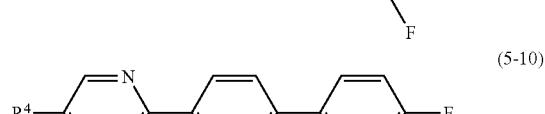

(5-10)

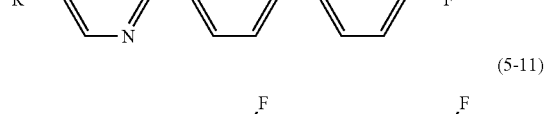

(5-11)

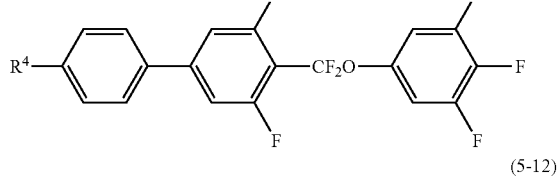

(5-12)

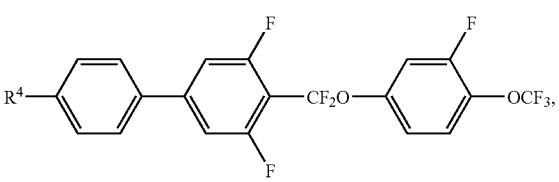

wherein $R^4$ is alkyl having 1 to 12 carbons or alkenyl having 2 to 12 carbons.

14. The liquid crystal composition according to claim 13, wherein the fifth component is at least one compound selected from the group of compounds represented by formula (5-9).

15. The liquid crystal composition according to claim 13, wherein the fifth component is at least one compound selected from the group of compounds represented by formula (5-11).

16. The liquid crystal composition according to claim 13, wherein the fifth component is a mixture of at least one compound selected from the group of compounds represented by formula (5-9) and at least one compound selected from the group of compounds represented by formula (5-11).

17. The liquid crystal composition according to claim 12, wherein a proportion of the fifth component is from 5 wt % to 30 wt % based on a total weight of the liquid crystal composition.

18. The liquid crystal composition according to claim 1, wherein the composition has a maximum temperature of a nematic phase of 70° C. or more, an optical anisotropy (25° C.) of 0.08 or more at a wavelength of 589 nm, and a dielectric anisotropy (25° C.) of 2 or more at a frequency of 1 kHz.

19. A liquid crystal display device that includes the liquid crystal composition according to claim 1.

20. The liquid crystal display device according to claim 19, which has an operation mode of TN mode, OCB mode or IPS mode, and has a driving mode of an active matrix mode.

21. The liquid crystal composition according to claim 5, further including at least one compound selected from the group of compounds represented by formula (5) as a fifth component:

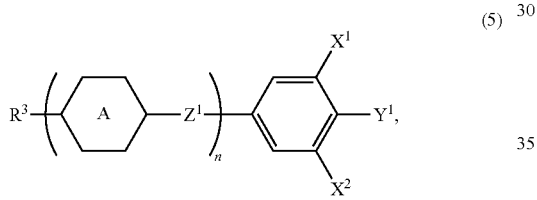

(5)

wherein $R^3$ is alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring A is independently 1,4-cyclohexylene, 1,3-dioxan-2,5-diyl, 1,4-phenylene, 3-fluoro-1,4-phenylene, 3,5-difluoro-1,4-phenylene or 2,5-pyrimidine; $Z^1$ is independently a single bond, ethylene, carbonyloxy or difluoromethyleneoxy; $X^1$ and $X^2$ are each independently hydrogen or fluorine; $Y^1$ is fluorine, chlorine or trifluoromethoxy; and n is 1 or 2.

22. The liquid crystal composition according to claim 21, wherein the fifth component is at least one compound selected from the group of compounds represented by formula (5-1) to (5-12):

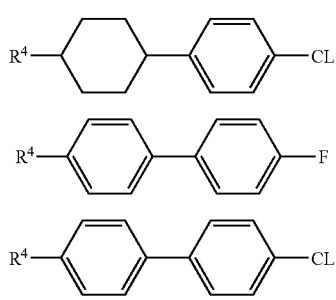

(5-1)

(5-2)

(5-3)

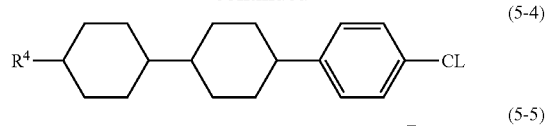

(5-4)

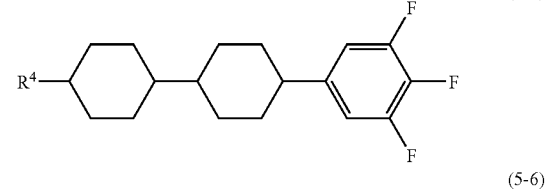

(5-5)

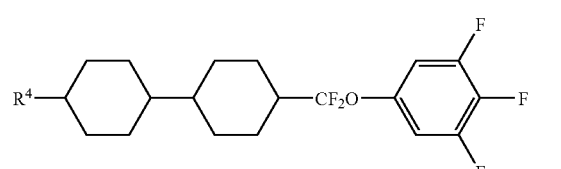

(5-6)

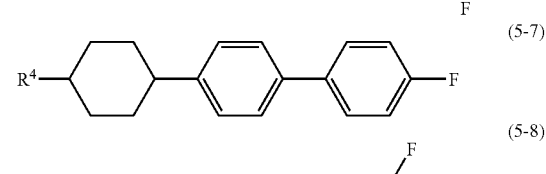

(5-7)

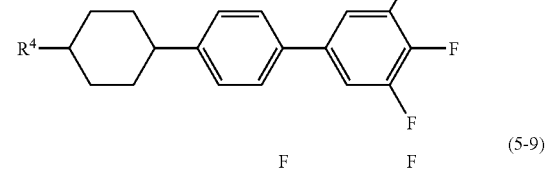

(5-8)

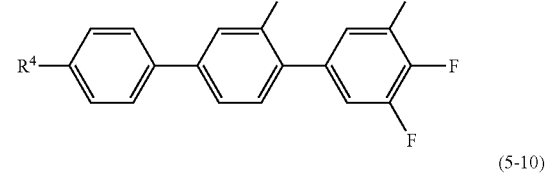

(5-9)

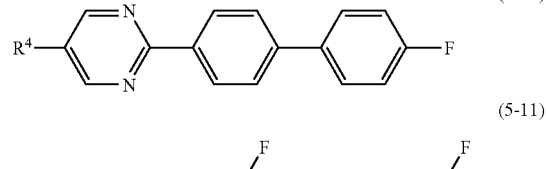

(5-10)

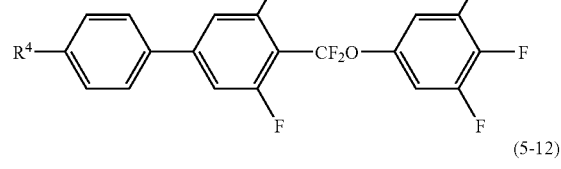

(5-11)

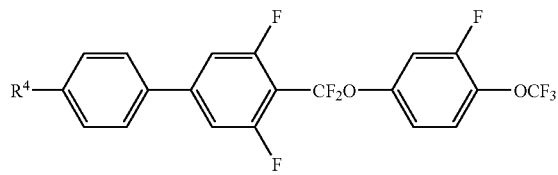

(5-12)

wherein $R^4$ is alkyl having 1 to 12 carbons or alkenyl having 2 to 12 carbons.

23. The liquid crystal composition according to claim 21, wherein a proportion of the fifth component is from 5 wt % to 30 wt % based on a total weight of the liquid crystal composition.

* * * * *